United States Patent
Uchida

(10) Patent No.: US 8,086,363 B2
(45) Date of Patent: Dec. 27, 2011

(54) DRIVE CONTROL DEVICE FOR VEHICLE, AND VEHICLE

(75) Inventor: Kenji Uchida, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 417 days.

(21) Appl. No.: 12/312,141

(22) PCT Filed: Dec. 10, 2007

(86) PCT No.: PCT/JP2007/074183
§ 371 (c)(1),
(2), (4) Date: Apr. 28, 2009

(87) PCT Pub. No.: WO2008/081703
PCT Pub. Date: Jul. 10, 2008

(65) Prior Publication Data
US 2010/0063660 A1    Mar. 11, 2010

(30) Foreign Application Priority Data
Jan. 4, 2007  (JP) .................................. 2007-000111

(51) Int. Cl.
*B60W 20/00*        (2006.01)
*G01M 3/04*         (2006.01)
(52) U.S. Cl. ...................... 701/22; 180/65.285; 318/803
(58) Field of Classification Search ................ 701/22; 180/65.27, 65.285, 65.29; 318/803; 324/509, 324/521, 522
See application file for complete search history.

(56) References Cited

U.S. PATENT DOCUMENTS

| 3,996,513 | A  | * | 12/1976 | Butler ........................... 324/509 |
| 5,099,186 | A  | * | 3/1992  | Rippel et al. ................... 318/803 |
| 5,481,194 | A  | * | 1/1996  | Schantz et al. ................. 324/522 |
| 6,388,451 | B1 | * | 5/2002  | Burba et al. ................... 324/522 |
| 6,456,085 | B1 | * | 9/2002  | Dietl et al. .................... 324/509 |
| 6,518,736 | B2 | * | 2/2003  | Sasaki et al. ..................... 322/16 |
| 2002/0164873 | A1 | * | 11/2002 | Masuda et al. ................ 438/689 |
| 2003/0146726 | A1 | * | 8/2003  | Ishikawa et al. .............. 318/442 |
| 2004/0162696 | A1 | * | 8/2004  | Kumar .......................... 702/132 |

FOREIGN PATENT DOCUMENTS

| JP | A-2004-170123    | 6/2004 |
| JP | A-2005-137127    | 5/2005 |
| JP | A-2005-192324    | 7/2005 |
| JP | A-2005-245081    | 9/2005 |
| JP | A-2005-304138    | 10/2005 |
| JP | A-2006-101632    | 4/2006 |
| JP | A-2007-157631    | 6/2007 |
| WO | WO 2006/035959 A1 | 4/2006 |

* cited by examiner

*Primary Examiner* — Drew Brown
(74) *Attorney, Agent, or Firm* — Oliff & Berridge, PLC

(57) ABSTRACT

A vehicle is mounted with a drive device provided with a plurality of rotating electrical machines, and a drive unit driving the plurality of rotating electrical machines. A drive control device for the vehicle includes an electrical leak detector detecting electrical leak in the drive device, and a control device. The control device identifies an electrical leak location by receiving a result of the detection made by the electrical leak detector, and determines which rotating electrical machine out of the plurality of rotating electrical machines is allowed to operate when the vehicle is driven next time, in accordance with the electrical leak location, while the vehicle is stopped.

12 Claims, 12 Drawing Sheets

FIG.5
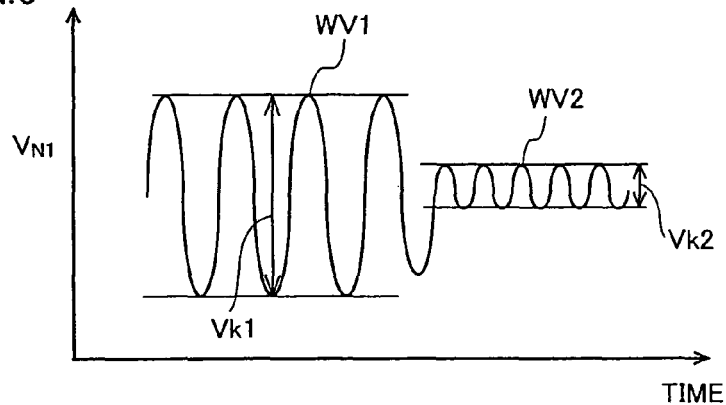
FIG.6
|  | FLAG 1 | FLAG 2 | FLAG 3 |
|---|---|---|---|
| SMR | ○ |  |  |
| MG1 |  | ○ |  |
| MG2 |  |  | ○ |
| MG3 |  | ○ |  |
| AIR-CONDITIONER | ○ |  |  |
FIG.7
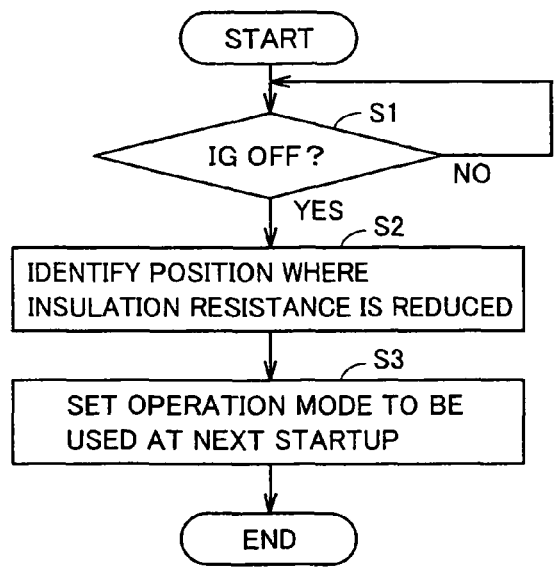

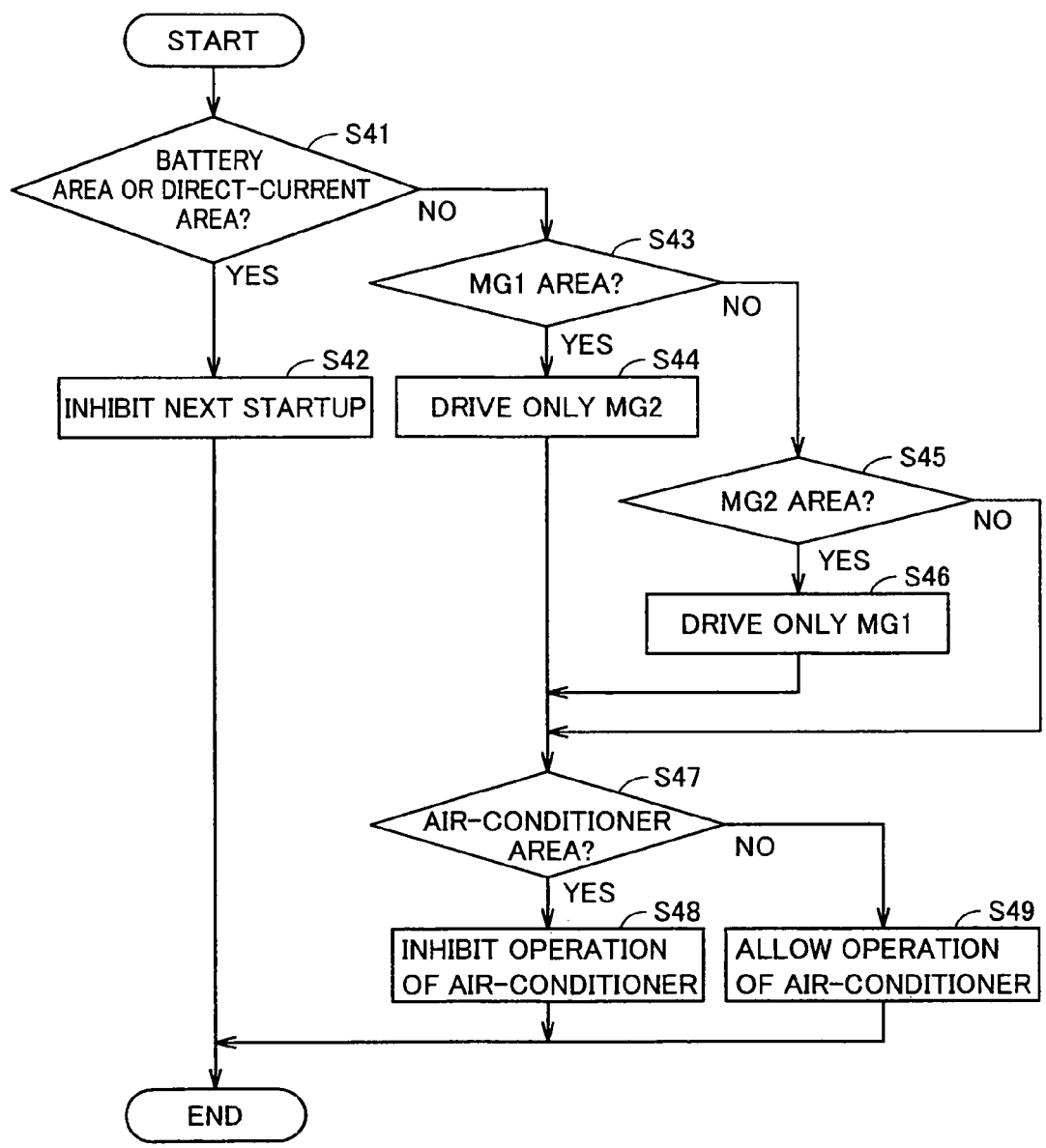

DRIVE CONTROL DEVICE FOR VEHICLE, AND VEHICLE

TECHNICAL FIELD

The present invention relates to a drive control device for a vehicle, and a vehicle, and particularly relates to a drive control device for a vehicle provided with a motor as a driving source, and a vehicle provided with the drive control device.

BACKGROUND ART

In recent years, attention has been focused on a Hybrid Vehicle, an Electric Vehicle, and the like in view of environmental issues. These vehicles are generally configured to be able to sense a certain anomaly when it occurs.

For example, Japanese Patent Laying-Open No. 2005-245081 discloses an electric vehicle control device in which an electric motor is driven by an inverter. The control device includes a plurality of physical quantity detection means for detecting a plurality of physical quantities, respectively, which directly or indirectly relate to operations of the inverter and the electric motor, failure determination means for determining that a failure occurs when a prescribed change occurs or a change exceeding a prescribed value occurs in the detected physical quantities, and failure location determination means for identifying a failure location on the vehicle based on a result of the determination made by the failure determination means.

However, Japanese Patent Laying-Open No. 2005-245081 merely discloses that the control device identifies a failure location. In general, when an anomaly of the vehicle is sensed, startup of the vehicle is inhibited. However, if startup of the vehicle is uniformly inhibited regardless of a location of an anomaly or a degree of the anomaly, there may occur an event that causes a user to feel inconvenience.

DISCLOSURE OF THE INVENTION

An object of the present invention is to provide a drive control device for a vehicle, capable of suppressing decrease in user convenience if an anomaly occurs in the vehicle, and a vehicle provided with the drive control device.

To summarize, the present invention is a drive control device controlling a drive device for a vehicle, the drive device being provided with a plurality of rotating electrical machines and a drive unit driving the plurality of rotating electrical machines. The drive control device includes: an electrical leak detection unit detecting electrical leak in the drive device; and an operation determination unit identifying an electrical leak location based on a result of the detection made by the electrical leak detection unit, and determining which rotating electrical machine out of the plurality of rotating electrical machines is allowed to operate when the vehicle is driven next time, in accordance with the electrical leak location being identified, while the vehicle is stopped.

Preferably, the drive unit includes a direct-current power supply, and a power conversion unit converting direct-current power obtained from the direct-current power supply into alternating-current power, and supplying the alternating-current power to the plurality of rotating electrical machines. The operation determination unit identifies any of the direct-current power supply, the power conversion unit, and the plurality of rotating electrical machines, as the electrical leak location.

More preferably, the drive device further includes an internal combustion engine. The plurality of rotating electrical machines include a first rotating electrical machine having a rotary shaft mechanically coupled to a crankshaft of the internal combustion engine, and a second rotating electrical machine having a rotary shaft mechanically coupled to a rotary shaft of a wheel. The drive unit further includes a connection unit configured to be able to interrupt connection between the direct-current power supply and the power conversion unit in accordance with an interruption command. The operation determination unit generates the interruption command for setting the connection unit to an interrupted state and allows operations of the first and second rotating electrical machines, when the direct-current power supply is identified as the electrical leak location. The operation determination unit inhibits the operation of one of the first and second rotating electrical machines and allows the operation of the other of the first and second rotating electrical machines, when the one of the first and second rotating electrical machines is identified as the electrical leak location. The operation determination unit inhibits the operations of the first and second rotating electrical machines, when the power conversion unit is identified as the electrical leak location.

Further preferably, the plurality of rotating electrical machines further include a third rotating electrical machine, an allowable amount of a current inputted to the third rotating electrical machine being smaller than an allowable amount of a current inputted to each of the first and second rotating electrical machines. The operation determination unit inhibits an operation of the third rotating electrical machine, when any of the third rotating electrical machine and the power conversion unit is identified as the electrical leak location.

Further preferably, the wheel is one of a front wheel and a rear wheel of the vehicle. The plurality of rotating electrical machines further include a third rotating electrical machine for driving the other of the front wheel and the rear wheel of the vehicle. The operation determination unit allows an operation of the third rotating electrical machine, when a portion other than the third rotating electrical machine is identified as the electrical leak location in the drive device.

More preferably, the plurality of rotating electrical machines include a first rotating electrical machine driving one of a front wheel and a rear wheel of the vehicle, and a second rotating electrical machine driving the other of the front wheel and the rear wheel of the vehicle. The operation determination unit inhibits an operation of one of the first and second rotating electrical machines and allows an operation of the other of the first and second rotating electrical machines, when the one of the first and second rotating electrical machines is identified as the electrical leak location. The operation determination unit inhibits the operations of the first and second rotating electrical machines, when any of the direct-current power supply and the power conversion unit is identified as the electrical leak location.

More preferably, the plurality of rotating electrical machines further include a third rotating electrical machine, an allowable amount of a current inputted to the third rotating electrical machine being smaller than an allowable amount of a current inputted to each of the first and second rotating electrical machines. The operation determination unit inhibits an operation of the third rotating electrical machine, when any of the third rotating electrical machine and the power conversion unit is identified as the electrical leak location.

According to another aspect of the present invention, the present invention is a vehicle including: a drive device including a plurality of rotating electrical machines and a drive unit driving the plurality of rotating electrical machines; and a drive control device controlling the drive device. The drive control device includes an electrical leak detection unit detecting electrical leak in the drive device, and an operation determination unit identifying an electrical leak location based on a result of the detection made by the electrical leak detection unit, and determining which rotating electrical machine out of the plurality of rotating electrical machines is allowed to operate when the vehicle is driven next time, in accordance with the electrical leak location being identified, while the vehicle is stopped.

Preferably, the drive unit has a direct-current power supply, and a power conversion unit converting direct-current power obtained from the direct-current power supply into alternating-current power, and supplying the alternating-current power to the plurality of rotating electrical machines. The operation determination unit identifies any of the direct-current power supply, the power conversion unit, and the plurality of rotating electrical machines, as the electrical leak location.

More preferably, the drive device further includes an internal combustion engine. The plurality of rotating electrical machines include a first rotating electrical machine having a rotary shaft mechanically coupled to a crankshaft of the internal combustion engine, and a second rotating electrical machine having a rotary shaft mechanically coupled to a rotary shaft of a wheel. The drive unit further includes a connection unit configured to be able to interrupt connection between the direct-current power supply and the power conversion unit in accordance with an interruption command. The operation determination unit sets the connection unit to an interrupted state and allows operations of the first and second rotating electrical machines, when the direct-current power supply is identified as the electrical leak location. The operation determination unit inhibits the operation of one of the first and second rotating electrical machines and allows the operation of the other of the first and second rotating electrical machines, when the one of the first and second rotating electrical machines is identified as the electrical leak location. The operation determination unit inhibits the operations of the first and second rotating electrical machines, when the power conversion unit is identified as the electrical leak location.

Further preferably, the plurality of rotating electrical machines further include a third rotating electrical machine, an allowable amount of a current inputted to the third rotating electrical machine being smaller than an allowable amount of a current inputted to each of the first and second rotating electrical machines. The operation determination unit inhibits an operation of the third rotating electrical machine, when any of the third rotating electrical machine and the power conversion unit is identified as the electrical leak location.

Further preferably, the wheel is one of a front wheel and a rear wheel of the vehicle. The plurality of rotating electrical machines further include a third rotating electrical machine for driving the other of the front wheel and the rear wheel of the vehicle. The operation determination unit allows an operation of the third rotating electrical machine, when a portion other than the third rotating electrical machine is identified as the electrical leak location in the drive device.

More preferably, the plurality of rotating electrical machines include a first rotating electrical machine driving one of a front wheel and a rear wheel of the vehicle, and a second rotating electrical machine driving the other of the front wheel and the rear wheel of the vehicle. The operation determination unit inhibits an operation of one of the first and second rotating electrical machines and allows an operation of the other of the first and second rotating electrical machines, when the one of the first and second rotating electrical machines is identified as the electrical leak location. The operation determination unit inhibits the operations of the first and second rotating electrical machines, when any of the direct-current power supply and the power conversion unit is identified as the electrical leak location.

More preferably, the plurality of rotating electrical machines further include a third rotating electrical machine, an allowable amount of a current inputted to the third rotating electrical machine being smaller than an allowable amount of a current inputted to each of the first and second rotating electrical machines. The operation determination unit inhibits an operation of the third rotating electrical machine, when any of the third rotating electrical machine and the power conversion unit is identified as the electrical leak location.

Therefore, according to the present invention, it becomes possible to suppress decrease in user convenience when an anomaly occurs in the vehicle.

BRIEF DESCRIPTION OF THE DRAWINGS

FIG. 5 is a drawing for describing a method of detecting electrical leak by electrical leak detector 42 shown in FIG. 3.

FIG. 6 is a drawing for describing a method of identifying a location where insulation resistance is reduced.

FIG. 7 is a flowchart for describing processing during stop of the operation of vehicle 100, executed at control device 30 shown in FIG. 1.

FIG. 15 is a flowchart that shows a modification of the processing in step S3 shown in FIG. 7.

BEST MODES FOR CARRYING OUT THE INVENTION

Figure 1:
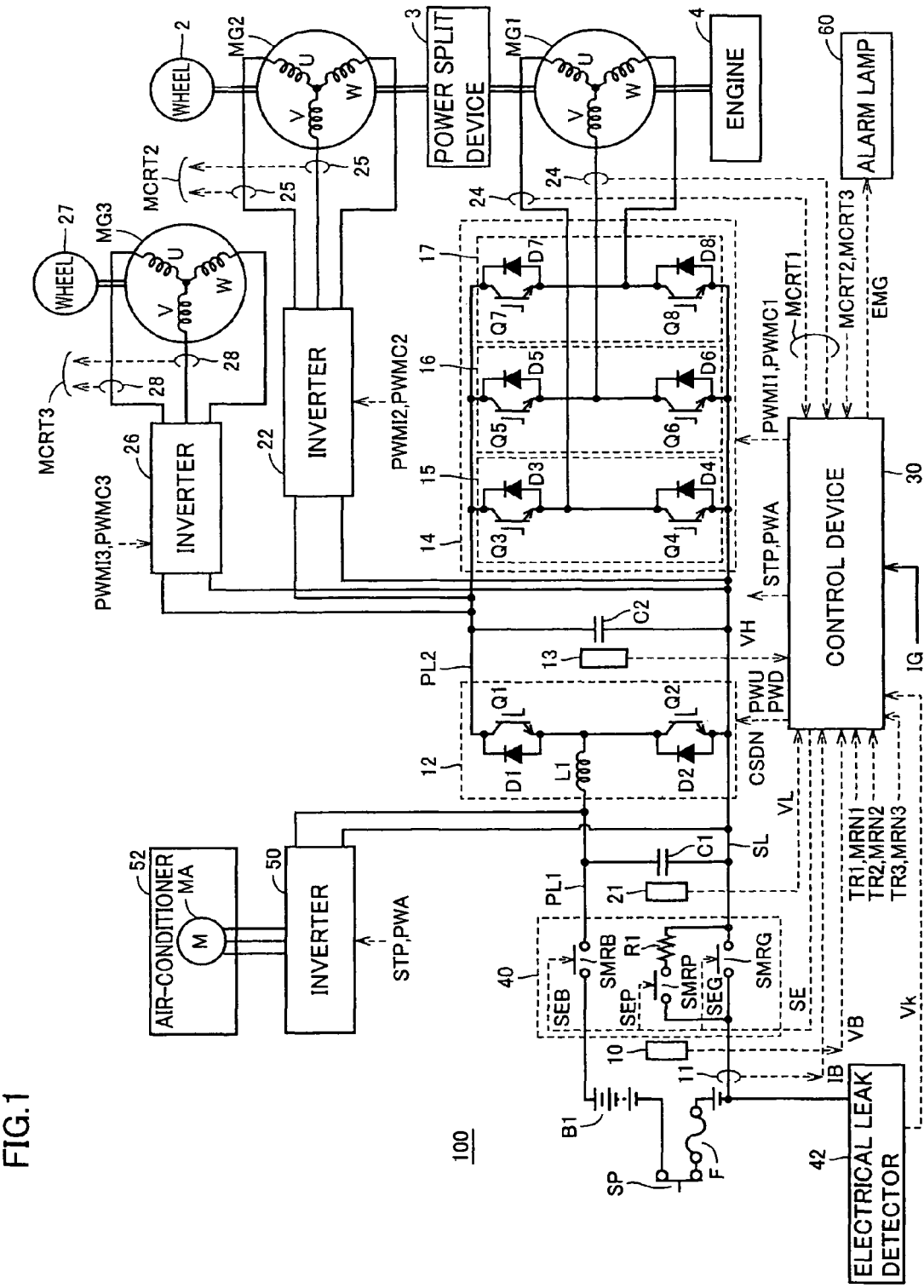
FIG. 1 is a drawing that shows a configuration of a vehicle provided with a drive control device for the vehicle according to the present embodiment.

An embodiment of the present invention will hereinafter be described in detail with reference to the drawings. It is noted that the same or corresponding portions in the drawings are provided with the same reference characters and the description thereof will not be repeated.

FIG. 1 is a drawing that shows a configuration of a vehicle provided with a drive control device for the vehicle according to the present embodiment.

With reference to FIG. 1, a vehicle 100 includes a battery B1, a connection unit 40, motor generators MG1, MG2, an engine 4, a power split device 3, a wheel 2, a control device 30, and an electrical leak detector 42.

Power split device 3 is a mechanism coupled to engine 4 and motor generators MG1, MG2, for splitting driving power among them. For example, a planetary gear mechanism that has three rotary shafts of a sun gear, a planetary carrier, and a ring gear may be used as the power split device. The three rotary shafts are connected to rotary shafts of engine 4 and motor generators MG1, MG2, respectively. For example, by making hollow the rotary shaft of motor generator MG1 and allowing a driving power shaft of engine 4 to pass therethrough, it is possible to linearly align motor generator MG2, power split device 3, motor generator MG1, and engine 4.

It is noted that the rotary shaft of motor generator MG2 is coupled to wheel 2 by a reduction gear and a differential gear not shown. A speed reducer for the rotary shaft of motor generator MG2 may further be incorporated in power split device 3.

Motor generator MG1 is used as a power generator driven by engine 4, and also used as an electric motor capable of starting engine 4. Electric power obtained through power generation by motor generator MG1 is used for, for example, driving motor generator MG2. Motor generator MG2 is mainly used as an electric motor that drives a driving wheel (wheel 2) of vehicle 100.

Connection unit 40 includes a system main relay SMRG connected to a negative electrode of battery B1, a resistor R1 electrically connected between the negative electrode of battery B1 and a ground line SL, a system main relay SMRP connected in series to resistor R1 between the negative electrode of battery B1 and ground line SL, and a system main relay SMRB connected to a positive electrode of battery B1. On/off states of system main relays SMRG, SMRP, SMRB are controlled in accordance with signals SEG, SEP, SEB provided from control device 30, respectively. Specifically, system main relays SMRG, SMRP, SMRB are set to an on state by signals SEG, SEP, SEB at an H (logic high) level, respectively, and set to an off state by signals SEG, SEP, SEB at an L (logic low) level, respectively.

Vehicle 100 further includes a service plug SP, a fuse F, a voltage sensor 10, and a current sensor 11.

Service plug SP and fuse F are connected in series to battery B1. In a state where a service cover (not shown) is opened, service plug SP interrupts a high voltage. Voltage sensor 10 measures a voltage VB between the terminals of battery B1. Current sensor 11 senses a current IB that flows through battery B1.

It is noted that a secondary battery such as a nickel-hydrogen battery or a lithium-ion battery, or a fuel cell or the like may be used as battery B1.

Electrical leak detector 42 is connected to ground line SL at a location closer to battery B1 with respect to system main relay SMRG. Electrical leak detector 42 outputs a voltage value Vk indicating the presence or absence of electrical leak to control device 30.

Vehicle 100 further includes a smoothing capacitor C1 connected between power supply line PL1 and ground line SL, a voltage sensor 21 that senses a voltage VL between the terminals of smoothing capacitor C1 and outputs the same to control device 30, a step-up converter 12 that steps up a voltage between the terminals of smoothing capacitor C1, a smoothing capacitor C2 that smoothes the voltage stepped up by step-up converter 12, and a voltage sensor 13 that senses a voltage between terminals of smoothing capacitor C2 (a voltage VH) and outputs the same to control device 30.

Step-up converter 12 includes a reactor L1 having one end connected to power supply line PL1, IGBT elements Q1, Q2 connected in series between power supply line PL2 and ground line SL, and diodes D1, D2 connected in parallel to IGBT elements Q1, Q2, respectively.

Reactor L1 has the other end connected to an emitter of IGBT element Q1 and a collector of IGBT element Q2. Diode D1 has a cathode connected to a collector of IGBT element Q1, and diode D1 has an anode connected to the emitter of IGBT element Q1. Diode D2 has a cathode connected to the collector of IGBT element Q2, and diode D2 has an anode connected to an emitter of IGBT element Q2.

Inverter 14 receives the stepped-up voltage from step-up converter 12, and drives motor generator MG1 for, for example, starting engine 4. Further, inverter 14 returns electric power generated at motor generator MG1 by mechanical power transmitted from engine 4, to step-up converter 12. At this time, step-up converter 12 is controlled by control device 30 such that it operates as a step-down circuit.

Inverter 14 includes a U-phase arm 15, a V-phase arm 16, and a W-phase arm 17. U-phase arm 15, V-phase arm 16, and W-phase arm 17 are connected in parallel between power supply line PL2 and ground line SL.

U-phase arm 15 includes IGBT elements Q3, Q4 connected in series between power supply line PL2 and ground line SL, and diodes D3, D4 connected in parallel to IGBT elements Q3, Q4, respectively. Diode D3 has a cathode connected to a collector of IGBT element Q3, and diode D3 has an anode connected to an emitter of IGBT element Q3. Diode D4 has a cathode connected to a collector of IGBT element Q4, and diode D4 has an anode connected to an emitter of IGBT element Q4.

V-phase arm 16 includes IGBT elements Q5, Q6 connected in series between power supply line PL2 and ground line SL, and diodes D5, D6 connected in parallel to IGBT elements Q5, Q6, respectively. Diode D5 has a cathode connected to a collector of IGBT element Q5, and diode D5 has an anode connected to an emitter of IGBT element Q5. Diode D6 has a cathode connected to a collector of IGBT element Q6, and diode D6 has an anode connected to an emitter of IGBT element Q6.

W-phase arm 17 includes IGBT elements Q7, Q8 connected in series between power supply line PL2 and ground line SL, and diodes D7, D8 connected in parallel to IGBT elements Q7, Q8, respectively. Diode D7 has a cathode connected to a collector of IGBT element Q7, and diode D7 has an anode connected to an emitter of IGBT element Q7. Diode D8 has a cathode connected to a collector of IGBT element Q8, and diode D8 has an anode connected to an emitter of IGBT element Q8.

Motor generator MG1 is a three-phase permanent magnet synchronous motor, and ends on one side of the three coils of the U, V, and W-phases are all connected to a neutral point. The U-phase coil has the other end connected to a connection node of IGBT elements Q3, Q4. The V-phase coil has the other end connected to a connection node of IGBT elements Q5, Q6. Further, the W-phase coil has the other end connected to a connection node of IGBT elements Q7, Q8.

A current sensor 24 detects a current flowing through motor generator MG1 as a motor current value MCRT1, and outputs motor current value MCRT1 to control device 30.

An inverter 22 converts a direct-current voltage outputted by step-up converter 12 into a three-phase alternating current, and outputs the same to motor generator MG2 that drives wheel 2. Further, inverter 22 returns electric power generated at motor generator MG2 to step-up converter 12 as regenerative braking is performed. At this time, step-up converter 12 is controlled by control device 30 such that it operates as a step-down circuit. Although not shown, an internal configuration of inverter 22 is similar to that of inverter 14, and the detailed description thereof will not be repeated.

Vehicle 100 further includes an inverter 26, a wheel 27, a motor generator MG3, and a current sensor 28.

Motor generator MG3 drives wheel 27. It is noted that a rotary shaft of motor generator MG3 is coupled to wheel 27 by a reduction gear and a differential gear not shown. Inverter 26 converts a direct-current voltage outputted by step-up converter 12 into a three-phase alternating current, and outputs the same to motor generator MG3. Further, inverter 26 returns electric power generated at motor generator MG3 to step-up converter 12 as regenerative braking is performed. A configuration of inverter 26 is similar to that of inverter 14, and the detailed description thereof will not be repeated. Current sensor 28 detects a current flowing through motor generator MG3 as a motor current value MCRT3, and outputs motor current value MCRT3 to control device 30.

Here, wheels 2, 27 are a front wheel and a rear wheel of vehicle 100, respectively. However, wheels 2, 27 may also be a rear wheel and a front wheel of vehicle 100, respectively. It is noted that, to prevent FIG. 1 from being complicated, FIG. 1 simplifies two front wheels down to one wheel (one of wheels 2, 27), and simplifies two rear wheels down to one wheel (the other of wheels 2, 27), for illustration.

Vehicle 100 further includes an air-conditioner 52 having a motor MA, and an inverter 50 for driving motor MA. Specifically, motor MA is a motor for a compressor. Inverter 50 converts a direct-current voltage between power supply line PL1 and ground line SL into a three-phase alternating current, and outputs the same. It is noted that an output of motor MA is smaller than each output of motor generators MG1-MG3. Therefore, an allowable amount of a current inputted to motor MA is smaller than an allowable amount of a current inputted to each of motor generators MG1-MG3.

Control device 30 receives torque command values TR1-TR3, motor rotation speeds MRN1-MRN3, values of voltages VB, VL, VH, a value of a current IB, motor current values MCRT1-MCRT3, and a startup instruction IG. For example, when a driver turns on an ignition switch at startup of vehicle 100, startup instruction IG is switched from an off state to an on state, and when the driver turns off the ignition switch when the operation of vehicle 100 is stopped, startup instruction IG is switched from the on state to the off state.

Control device 30 outputs to step-up converter 12 a control signal PWU for providing a voltage step-up instruction, a control signal PWD for providing a voltage step-down instruction, and a signal CSDN for providing an operation inhibition instruction.

Further, control device 30 outputs to inverter 14 a drive instruction PWMI1 for converting a direct-current voltage, which corresponds to an output of step-up converter 12, into an alternating-current voltage for driving motor generator MG1, and a regeneration instruction PWMC1 for converting an alternating-current voltage generated at motor generator MG1 into a direct-current voltage and returning the same to step-up converter 12.

Similarly, control device 30 outputs to inverter 22 a drive instruction PWMI2 for converting a direct-current voltage into an alternating-current voltage for driving motor generator MG2, and a regeneration instruction PWMC2 for converting an alternating-current voltage generated at motor generator MG2 into a direct-current voltage and returning the same to step-up converter 12.

Similarly, control device 30 outputs to inverter 26 a drive instruction PWMI3 for converting a direct-current voltage into an alternating-current voltage for driving motor generator MG3, and a regeneration instruction PWMC3 for converting an alternating-current voltage generated at motor generator MG3 into a direct-current voltage and returning the same to step-up converter 12.

Control device 30 outputs to inverter 50 a drive instruction PWA for converting a direct-current voltage into an alternating-current voltage for driving motor MA. Further, control device 30 outputs to inverter 50 a signal STP for providing an operation inhibition instruction.

When startup instruction IG is switched from the on state to the off state, control device 30 senses the presence or absence of electrical leak based on voltage value Vk received from electrical leak detector 42. Further, control device 30 identifies an electrical leak location, namely, a location where insulation resistance is reduced, by controlling system main relays SMRB, SMRG, step-up converter 12, inverters 14, 22, 26, 50, and others.

If there is a location where insulation resistance is reduced, control device 30 determines an operation mode of vehicle 100 in accordance with the location. When startup instruction IG is switched from the off state to the on state, control device 30 operates vehicle 100 in the determined operation mode.

Conventionally, startup of the vehicle has been inhibited regardless of the location where insulation resistance is reduced. Therefore, even if a user wishes to run the vehicle only for a short distance, for example, the user cannot move the vehicle, and hence there was a high possibility of decrease in user convenience. In contrast, in the present embodiment, even if reduction in insulation resistance is detected after completion of the present operation of the vehicle, it is possible to perform limp home running in the next operation. Therefore, according to the present embodiment, it becomes possible to suppress decrease in user convenience.

Vehicle 100 further includes an alarm lamp 60. If control device 30 determines that insulation resistance is reduced in at least one of a plurality of inspection areas described below, control device 30 generates a signal EMG and outputs the same to alarm lamp 60. Alarm lamp 60 lights up in accordance with signal EMG. The driver thereby recognizes that a running mode of vehicle 100 is set to a limp home running mode when he/she starts vehicle 100.

It becomes thereby possible to encourage the driver to repair vehicle 100 promptly, for example, so that it becomes possible to repair vehicle 100 before a more serious anomaly occurs. During limp home running of vehicle 100, responsiveness of vehicle 100 may be more deteriorated than usual even if the driver manipulates an accelerator pedal. However, it is possible to inform the driver that vehicle 100 is in limp home running by lighting alarm lamp 60, so that the driver can be less likely to feel a sense of discomfort.

It is noted that, in the configuration shown in FIG. 1, portions other than control device 30, electrical leak detector 42, and wheels 2, 27 configure the drive device for the vehicle. Further, control device 30 and electrical leak detector 42 configure the drive control device for the vehicle.

Figure 2:
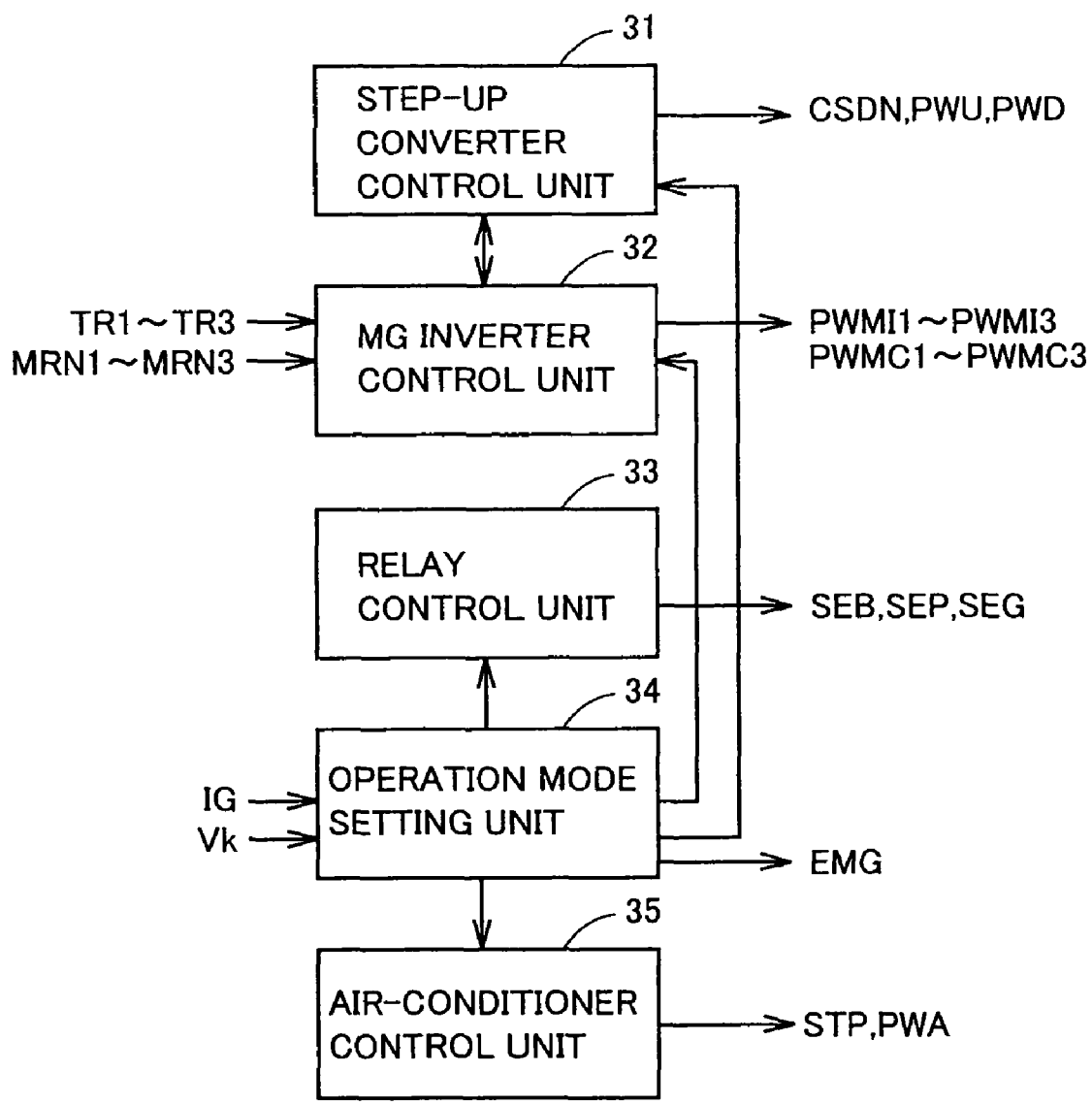
FIG. 2 is a functional block diagram of a control device 30 shown in FIG. 1.

FIG. 2 is a functional block diagram of control device 30 shown in FIG. 1. It is noted that control device 30 can be implemented by any of software and hardware.

With reference to FIG. 2 and FIG. 1, control device 30 includes a step-up converter control unit 31 that controls step-up converter 12, an MG inverter control unit 32 that controls motor generators MG1, MG2, MG3, a relay control unit 33 that controls connection unit 40, an operation mode setting unit 34 that sets an operation mode of vehicle 100 at the next startup of vehicle 100, and an air-conditioner control unit 35 for controlling an operation of motor MA.

Step-up converter control unit 31 outputs a voltage step-up instruction PWU and a voltage step-down instruction PWD to step-up converter 12 in FIG. 1. Further, MG inverter control unit 32 outputs drive instruction PWMI1 and regeneration instruction PWMC1 to inverter 14 based on torque command value TR1 and motor rotation speed MRN1. Similarly, MG inverter control unit 32 outputs drive instruction PWMI2 and regeneration instruction PWMC2 to inverter 22 based on torque command value TR2 and motor rotation speed MRN2, and outputs drive instruction PWMI3 and regeneration instruction PWMC3 to inverter 26 based on torque command value TR3 and motor rotation speed MRN3.

Relay control unit 33 outputs signals SEB, SEP, SEG to system main relays SMRB, SMRP, SMRG, respectively. It is noted that, at startup of vehicle 100, relay control unit 33 brings system main relays SMRB, SMRP into conduction and precharges smoothing capacitors C1, C2, and when the precharge is completed, brings system main relay SMRG into conduction and then opens system main relay SMRP. At this time, connection unit 40 is brought into the state where it can supply a current from battery B1 to motor generators MG1-MG3.

Air-conditioner control unit 35 outputs drive instruction PWA and outputs signal STP.

When startup instruction IG changes from the on state to the off state, operation mode setting unit 34 operates and stops each of step-up converter control unit 31, MG inverter control unit 32, relay control unit 33, and air-conditioner control unit 35, and based on voltage value Vk at that time, identifies in vehicle 100 (FIG. 1) a location where insulation resistance is reduced. Next, operation mode setting unit 34 determines an operation mode in accordance with the location where insulation resistance is reduced. The processing so far is identified as processing during stop of the operation of vehicle 100. Next, when startup instruction IG changes from the off state to the on state, operation mode setting unit 34 instructs each of step-up converter control unit 31, MG inverter control unit 32, relay control unit 33, and air-conditioner control unit 35 to perform a control operation or to inhibit a control operation, in accordance with the determined operation mode. Vehicle 100 thereby operates in accordance with the determined operation mode to be used at the next startup of vehicle 100.

Figure 3:
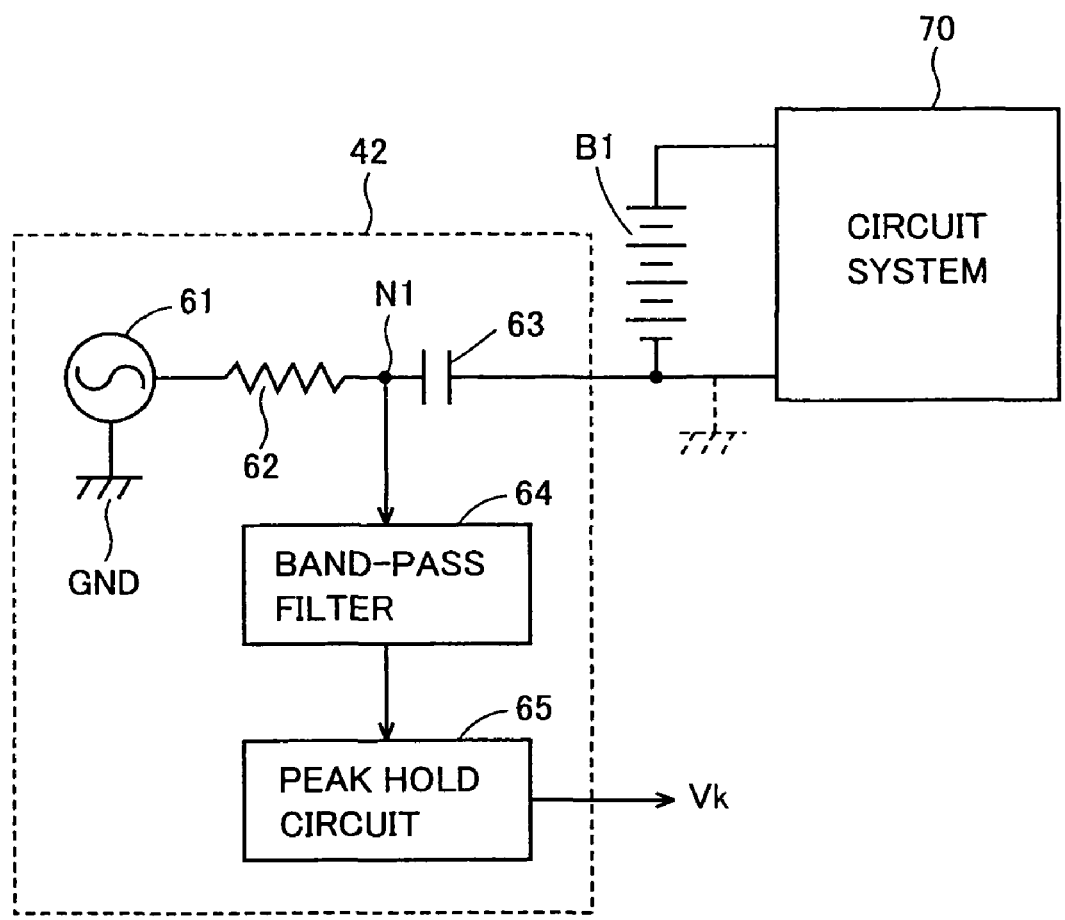
FIG. 3 is a configuration diagram of an electrical leak detector 42 shown in FIG. 1.

FIG. 3 is a configuration diagram of electrical leak detector 42 shown in FIG. 1.

With reference to FIG. 3, electrical leak detector 42 includes an alternating-current power supply 61, a resistor 62, a capacitor 63, a band-pass filter 64, and a peak hold circuit 65. For the sake of convenience in the description, FIG. 3 does not show service plug SP and fuse F shown in FIG. 1.

Alternating-current power supply 61 and resistor 62 are connected in series between a node N1 and a ground node GND (a chassis of the vehicle). Capacitor 63 is connected between node N1 and the negative electrode of battery B1. It is noted that all the circuits connected to battery B1 in FIG. 1 are collectively shown as a circuit system 70 in FIG. 3.

In electrical leak detector 42, alternating-current power supply 61 outputs a low-frequency alternating-current signal such as an alternating-current signal of 2.5 Hz. Band-pass filter 64 receives the alternating-current signal on node N1, and extracts only a component of 2.5 Hz from the received alternating-current signal, and outputs the same to peak hold circuit 65. Peak hold circuit 65 holds a peak of the alternating-current signal of 2.5 Hz received from band-pass filter 64, and outputs the held voltage value Vk to control device 30. As described below, voltage value Vk changes in accordance with the present or absence of electrical leak (e.g. whether or not the negative electrode of battery B1 is shorted to the ground node, and the like).

When electrical leak of the drive device for vehicle 100 shown in FIG. 1 is to be detected, the drive device is divided into a plurality of regions, and whether or not insulation resistance is reduced (whether or not electrical leak occurs) is determined as to each of the regions. By dividing the drive device into a plurality of regions as such, and conducting an inspection for reduction in insulation resistance, even if insulation resistance is reduced in a certain region, it becomes possible to control an operation of vehicle 100 such that the circuit included in the relevant region is not allowed to operate at the next startup. Therefore, according to the present embodiment, it becomes possible to allow vehicle 100 to perform limp home running at the next startup.

Figure 4:
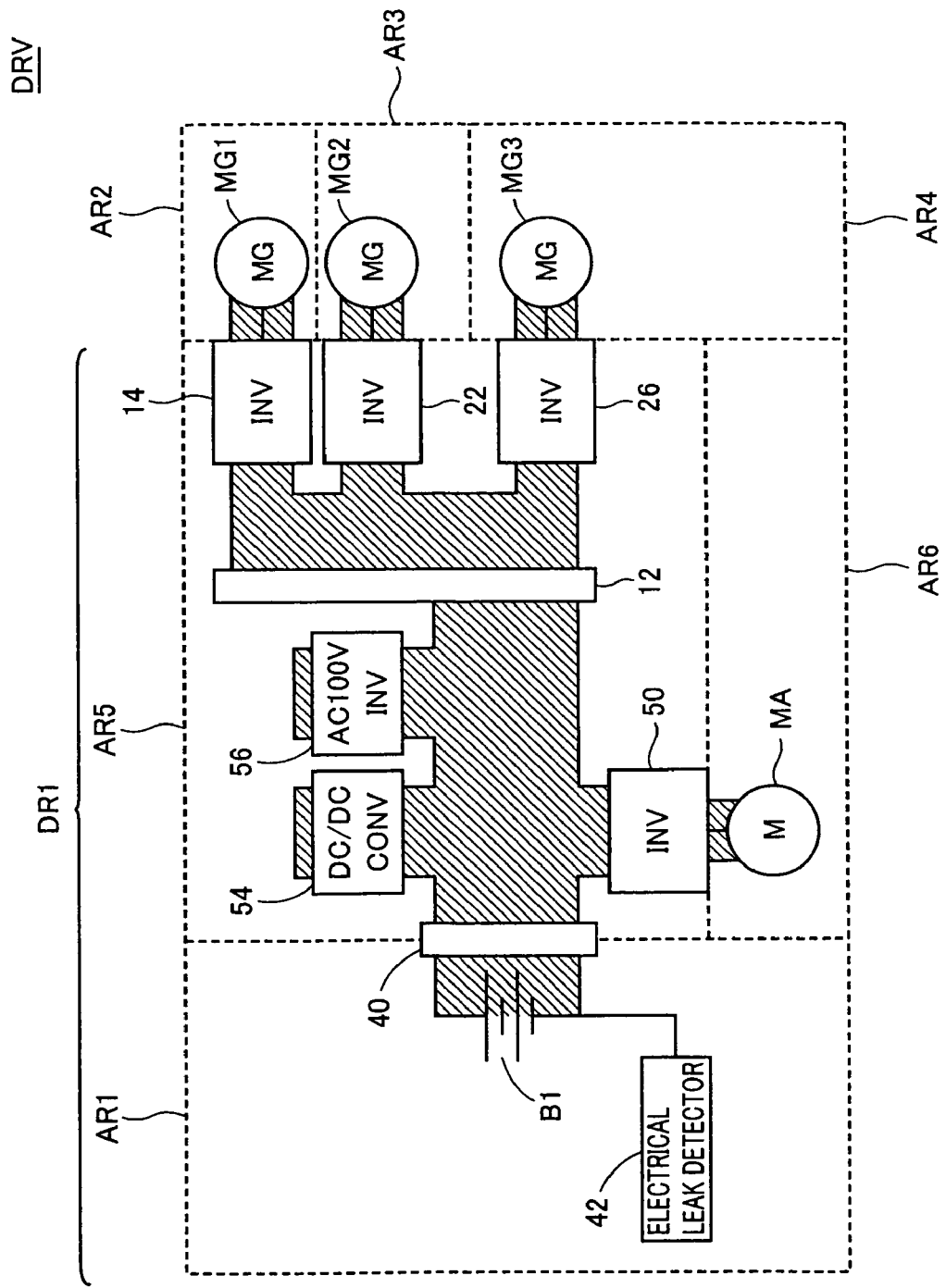
FIG. 4 is a schematic diagram for describing a drive device in a vehicle 100 in FIG. 1.

FIG. 4 is a schematic diagram for describing the drive device in vehicle 100 in FIG. 1.

With reference to FIG. 4 and FIG. 1, a drive device DRV is divided into regions AR1-AR6. Among them, a portion that includes regions AR1, AR5 is included in a drive unit DR1. It is noted that a range indicated by dashed lines in FIG. 4 is identified as a range that includes a high-voltage circuit.

Region AR1 is a region that includes battery B1 and electrical leak detector 42. Regions AR2, AR3, AR4 are a region that includes motor generator MG1, a region that includes motor generator MG2, and a region that includes motor generator MG3, respectively.

Region AR5 is a region that includes step-up converter 12, and inverters (shown as "INV" in the drawing) 14, 22, 26, 50. Region AR5 further includes a DC/DC converter 54 for converting a direct-current voltage (e.g. DC 200 V) of battery B1 into a prescribed magnitude of a direct-current voltage (e.g. DC 12 V), and an inverter 56 for converting a direct-current voltage of battery B1 into AC 100V. Region AR5 is a portion that corresponds to a "power conversion unit" in the present invention.

It is noted that in FIG. 4, connection unit 40 is located on a boundary between region AR1 and region AR5. Region AR6 includes motor MA.

FIG. 5 is a drawing for describing a method of detecting electrical leak by electrical leak detector 42 shown in FIG. 3.

With reference to FIG. 5 and FIG. 3, an alternating-current signal VN1 is an alternating-current signal outputted by band-pass filter 64. Alternating-current signal VN1 is made of a waveform WV1 when electrical leak does not occur in circuit system 70 or battery B1. In contrast, alternating-current signal VN1 is made of a waveform WV2 when electrical leak occurs in any of circuit system 70 and battery B1. Peak hold circuit 65 outputs a voltage value Vk1 based on waveform WV1, and outputs a voltage value Vk2 based on waveform WV2.

FIG. 6 is a drawing for describing a method of identifying a location where insulation resistance is reduced.

With reference to FIG. 6 and FIG. 2, operation mode setting unit 34 stores a flag 1, a flag 2, and a flag 3 for a system main relay (SMR). Here, the "SMR" comprehensively indicates system main relays SMRB, SMRP, SMRG.

For example, flag 1 is a flag that indicates an establishment of a condition that voltage value Vk changes when a circuit to be inspected is in operation (e.g. when system main relay SMR is in the on state). For example, flag 2 is a flag that indicates an establishment of a condition that voltage value Vk changes when an inspection for electrical leak is conducted. For example, flag 3 is a flag that indicates an establishment of a condition that voltage value Vk returns to an original value prior to the change when the circuit to be inspected is shut down (e.g. when system main relay SMR is in the off state). It is noted that in the table in FIG. 6, a symbol of a circle indicates that the above-described condition is established, and a blank in the table indicates that the above-described condition is not established.

Operation mode setting unit 34 also sets flags 1-3 to motor generators MG1, MG2, MG3, and the air-conditioner, so as to indicate whether or not the above-described conditions are established. Based on a combination of the flags that indicate establishment of the conditions as shown in FIG. 6, operation mode setting unit 34 identifies a region where insulation resistance is reduced, out of regions AR1-AR6 shown in FIG. 4.

FIG. 7 is a flowchart for describing processing during stop of the operation of the vehicle 100, executed at control device 30 shown in FIG. 1.

With reference to FIG. 7 and FIG. 1, control device 30 initially determines whether or not startup instruction IG is in the off state (step S1). If startup instruction IG is not in the off state, namely, if vehicle 100 is in operation (NO in step S1), determination processing in step S1 is repeated. In contrast, if startup instruction IG is in the off state, namely, if a shutdown instruction is inputted to control device 30 (YES in step S1), control device 30 identifies a position where insulation resistance is reduced (regions AR1-AR6 shown in FIG. 4) (step S2).

In step S2, control device 30 controls system main relays SMRP, SMRG, step-up converter 12, inverters 14, 22, 26, 50, and the like, and receives voltage value Vk from electrical leak detector 42. Based on changes in voltage value Vk, control device 30 identifies a position where insulation resistance is reduced.

Successively, control device 30 (operation mode setting unit 34 shown in FIG. 2) sets an operation mode to be used at the next startup in accordance with the position where insulation resistance is reduced, which position is identified by the processing in step S2 (step S3). It is noted that if there is no position where insulation resistance is reduced, namely, if there is no electrical leak location, an operation mode is set to a normal operation mode, and each of motor generators MG1-MG3 and motor MA is allowed to operate at the next startup of the vehicle.

When the operation in step S3 is completed, the entire processing is completed. It is noted that a setting (operation mode) in step S3 is retained.

As such, in the present embodiment, a position where insulation resistance is reduced is identified during stop of the operation of the vehicle. If a position where insulation resistance is reduced is identified during an operation of the vehicle, the system main relay may be brought into the off state during the operation of the vehicle, or a torque command value for each of motor generators MG1-MG3 may change significantly, for example, and hence running of the vehicle may highly possibly be influenced. In contrast, in the present embodiment, a position where insulation resistance is reduced is identified during stop of the operation of the vehicle, and hence such a problem can be prevented.

Figure 8:
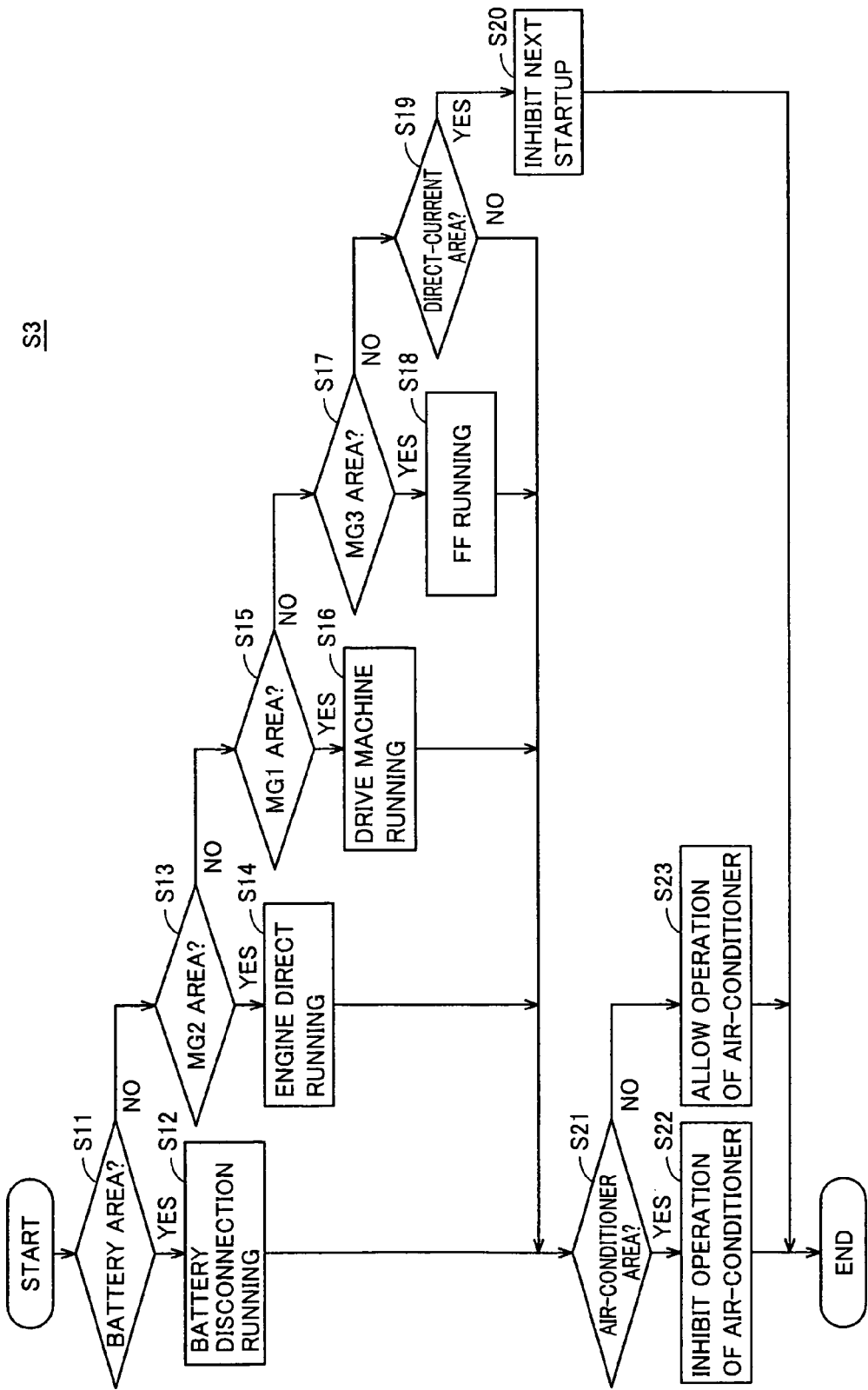
FIG. 8 is a flowchart for describing in detail the processing in step S3 in FIG. 7.

FIG. 8 is a flowchart for describing in detail the processing in step S3 in FIG. 7. For ease of understanding, it is noted that regions AR1-AR6 shown in FIG. 4 are hereinafter referred to as a "battery area", an "MG1 area", an "MG2 area", an "MG3 area", a "direct-current area", and an "air-conditioner area", respectively.

With reference to FIG. 8 and FIG. 2, operation mode setting unit 34 initially determines whether or not insulation resistance is reduced in the battery area (step S11). If insulation resistance is reduced in the battery area (YES in step S11), operation mode setting unit 34 sets the operation mode of vehicle 100 to a "battery disconnection running mode" (step S12). In this case, operations of both of motor generators MG1, MG2 are allowed.

In the battery disconnection running mode, the vehicle runs while keeping the system main relays in the off state. In this case, vehicle 100 is driven by engine 4, and motor generator MG2 assists in driving of vehicle 100 as needed. When motor generator MG2 drives the vehicle, engine 4 drives motor generator MG1, so that motor generator MG1 supplies electric power to motor generator MG2. It is noted that the system main relays are brought into the on state only at startup of engine 4, namely, only when motor generator MG1 rotates the crankshaft of engine 4.

In contrast, if insulation resistance is not reduced in the battery area (NO in step S11), operation mode setting unit 34 determines whether or not insulation resistance is reduced in the MG2 area (step S13). If insulation resistance is reduced in the MG2 area (YES in step S13), operation mode setting unit 34 sets the operation mode of vehicle 100 to an "engine direct running mode" (step S14). In this case, an operation of motor generator MG1 is allowed, while an operation of motor generator MG2 is inhibited.

In the engine direct running mode, motor generator MG1 outputs reaction force against the torque of engine 4. Therefore, vehicle 100 runs only by the torque directly transmitted from engine 4 to the ring gear via power split device 3.

Figure 9:
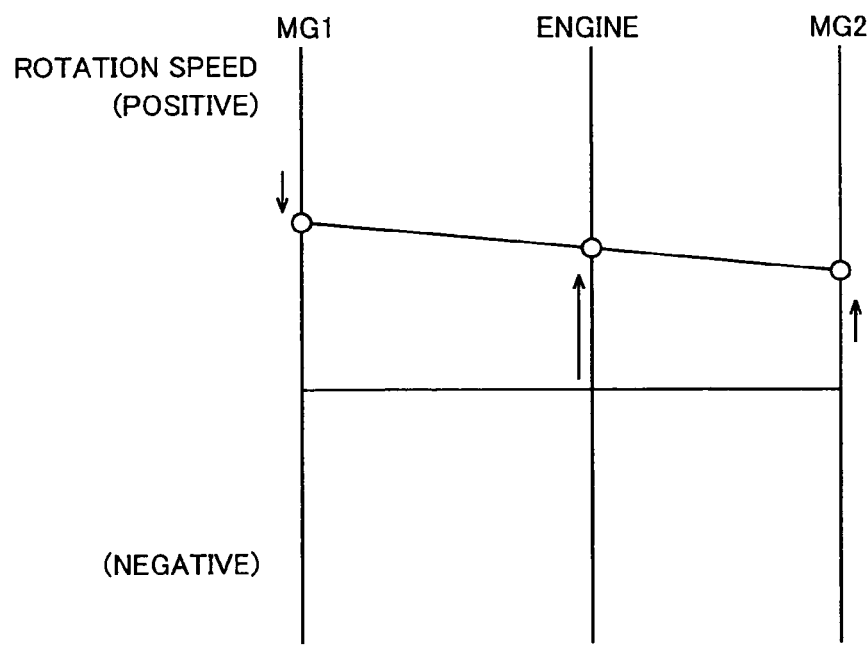
FIG. 9 is a nomographic chart for describing engine direct running.

FIG. 9 is a nomographic chart for describing engine direct running.

With reference to FIG. 9, a rotation speed of motor generator MG1, a rotation speed of motor generator MG2, and a rotation speed of engine 4 change such that they are always linearly aligned, if the rotation speeds of motor generators MG1, MG2 are arranged on opposite sides of the engine rotation speed.

When the engine rotation speed increases, engine torque increases accordingly. In addition, by allowing motor generator MG1 to output torque, the torque is transmitted to the ring gear coupled to the rotary shaft of motor generator MG2. Rotation of the ring gear is transmitted to the rotary shaft that rotates the wheel via a speed reducer and the like. Vehicle 100 is thereby capable of running.

With reference to FIG. 8 and FIG. 2 again, if insulation resistance is not reduced in the MG2 area (NO in step S13), operation mode setting unit 34 determines whether or not insulation resistance is reduced in the MG1 area (step S15). If insulation resistance is reduced in the MG1 area (YES in step S15), operation mode setting unit 34 sets the operation mode of vehicle 100 to a "drive machine running mode" (step S16). In this case, an operation of motor generator MG1 is inhibited, while an operation of motor generator MG2 is allowed. In the drive machine running mode, vehicle 100 runs only by motor generator MG2.

If insulation resistance is not reduced in the MG1 area (NO in step S15), operation mode setting unit 34 determines whether or not insulation resistance is reduced in the MG3 area (step S17). If insulation resistance is reduced in the MG3 area (YES in step S17), operation mode setting unit 34 sets the operation mode of vehicle 100 to an "FF running mode" (step S18). In the FF running mode, an operation of motor generator MG3 is inhibited, while operations of motor generators MG1, MG2 are allowed. Among wheels 2, 27, only vehicle 2 is driven, and wheel 27 rotates as the vehicle is driven.

In contrast, if insulation resistance is not reduced in the MG3 area (NO in step S17), operation mode setting unit 34 determines whether or not insulation resistance is reduced in the direct-current area (step S19).

If insulation resistance is reduced in the direct-current area (YES in step S19), operation mode setting unit 34 inhibits the next startup of vehicle 100 (step S20). In this case, an operation of each of motor generators MG1-MG3 and motor MA is inhibited.

An allowable amount of a current inputted to motor MA shown in FIG. 1 is smaller than an allowable amount of a current inputted to each of motor generators MG1-MG3. Therefore, as the cable that connects power supply line PL1 and inverter 50, and as the cable that connects ground line SL and inverter 50, a cable that has a current capacity smaller than a current capacity of power supply line PL1 (and ground line SL) may be used. In such a case, if inverter 50 is operated while a reduction in insulation resistance (electrical leak) occurs in the direct-current area, a current that exceeds a capacity may flow through the cable connected to inverter 50.

Further, if insulation resistance is reduced in a portion between the system main relays and the inverter, it is considered to be difficult to normally operate each of motor generators MG1-MG3. For such a reason, if insulation resistance is reduced in the direct-current area, the next startup of vehicle 100 is inhibited.

In contrast, if insulation resistance is not reduced in the direct-current area (NO in step S19), or if any of the processing in steps S12, S14, S16, S18 is completed, operation mode setting unit 34 determines whether or not insulation resistance is reduced in the air-conditioner area (step S21). If insulation resistance is reduced in the air-conditioner area (YES in step S21), operation mode setting unit 34 inhibits an operation of the air-conditioner (motor MA) (step S22). In contrast, if insulation resistance is not reduced in the air-conditioner area (NO in step S21), operation mode setting unit 34 allows an operation of the air-conditioner (motor MA) (step S23).

If any of the processing in steps S20, S22, S23 is completed, the entire processing in step S3 is completed.

Figure 10:
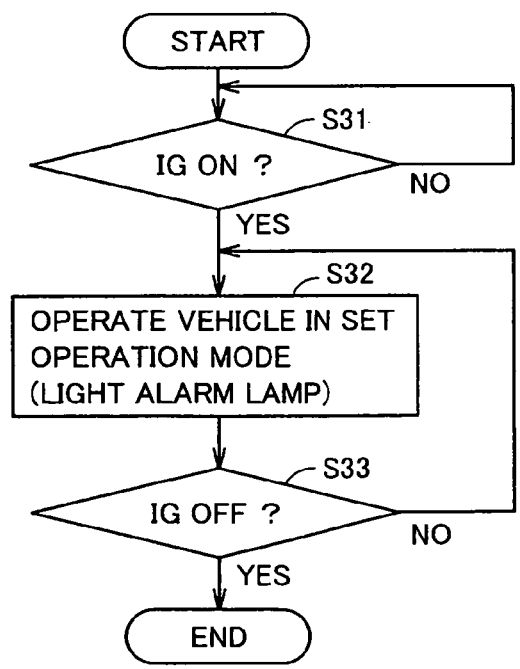
FIG. 10 is a flowchart for describing the processing by control device 30 during an operation of the vehicle.

FIG. 10 is a flowchart for describing the processing by control device 30 during an operation of the vehicle.

With reference to FIG. 10 and FIG. 1, control device 30 initially determines whether or not startup instruction IG is in the on state (step S31). If startup instruction IG is not in the on state, namely, if vehicle 100 is stopped (NO in step S31), the determination processing in step S31 is repeated. In contrast, if startup instruction IG is in the on state, namely, if a startup instruction is inputted to control device 30 (YES in step S31), control device 30 operates the vehicle in the operation mode set in the processing shown in the flowchart in FIG. 8 (step S32). It is noted that if the operation mode is other than the "normal operation mode", operation mode setting unit 34 outputs signal EMG. Alarm lamp 60 shown in FIG. 1 thereby lights up.

Successively, control device 30 determines whether or not startup instruction IG is in the off state (step S33). If startup instruction IG is not in the off state (NO in step S33), the processing returns to step S32. In contrast, if startup instruction IG is in the off state (YES in step S33), the entire processing is completed. At this time, the operation of the vehicle is stopped, and the processing shown in FIG. 7 and FIG. 8 is executed.

Modification

Figure 11:
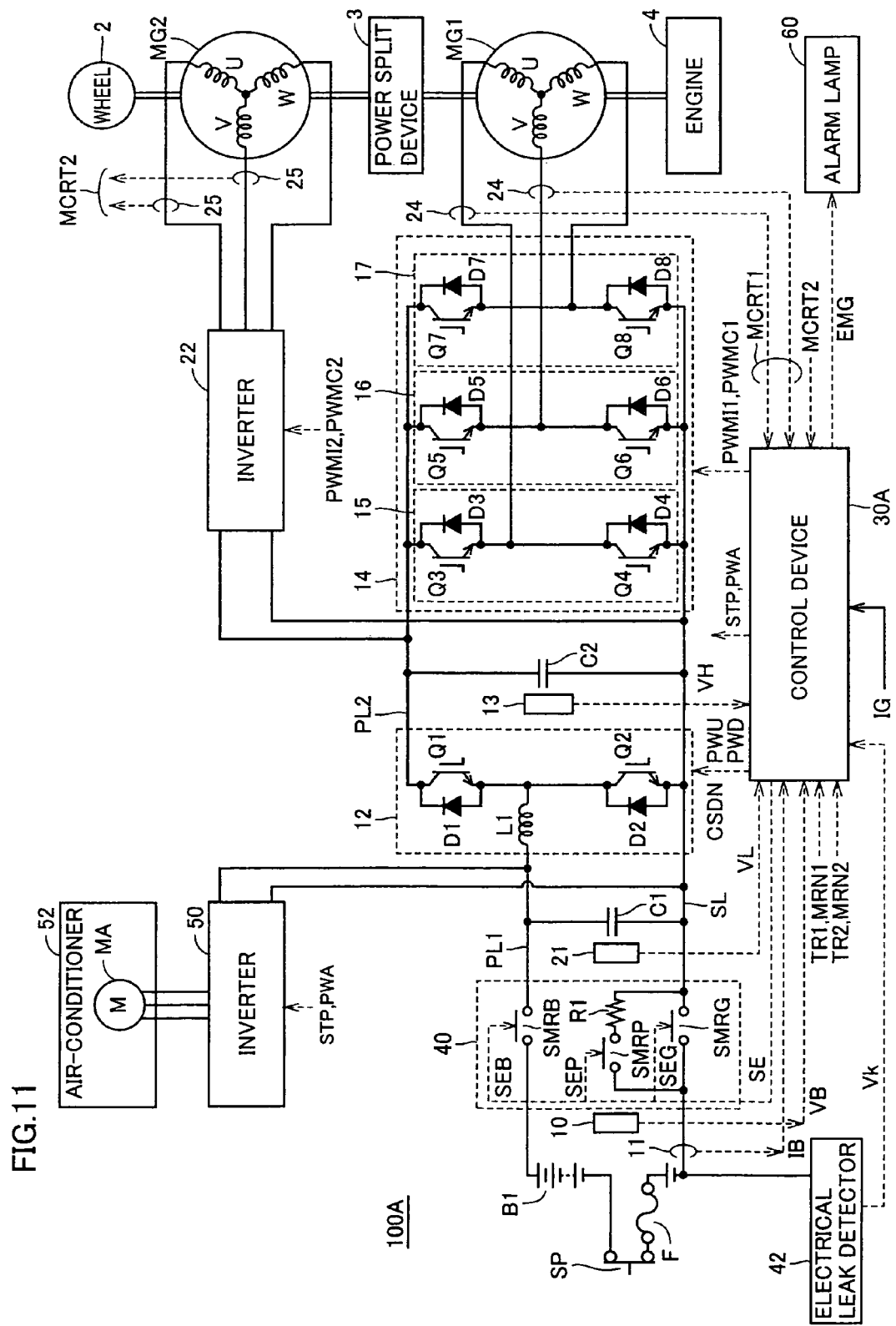
FIG. 11 is a drawing that shows a first modification of vehicle 100 shown in FIG. 1.

FIG. 11 is a drawing that shows a first modification of vehicle 100 shown in FIG. 1.

With reference to FIG. 11 and FIG. 1, a vehicle 100A differs from vehicle 100 in that it does not include inverter 26, motor generator MG3, and current sensor 28. Further, vehicle 100A differs from vehicle 100 in that it includes a control device 30A instead of control device 30. It is noted that although FIG. 11 does not show wheel 27, wheel 27 in this modification is identified as a driven wheel.

Figure 12:
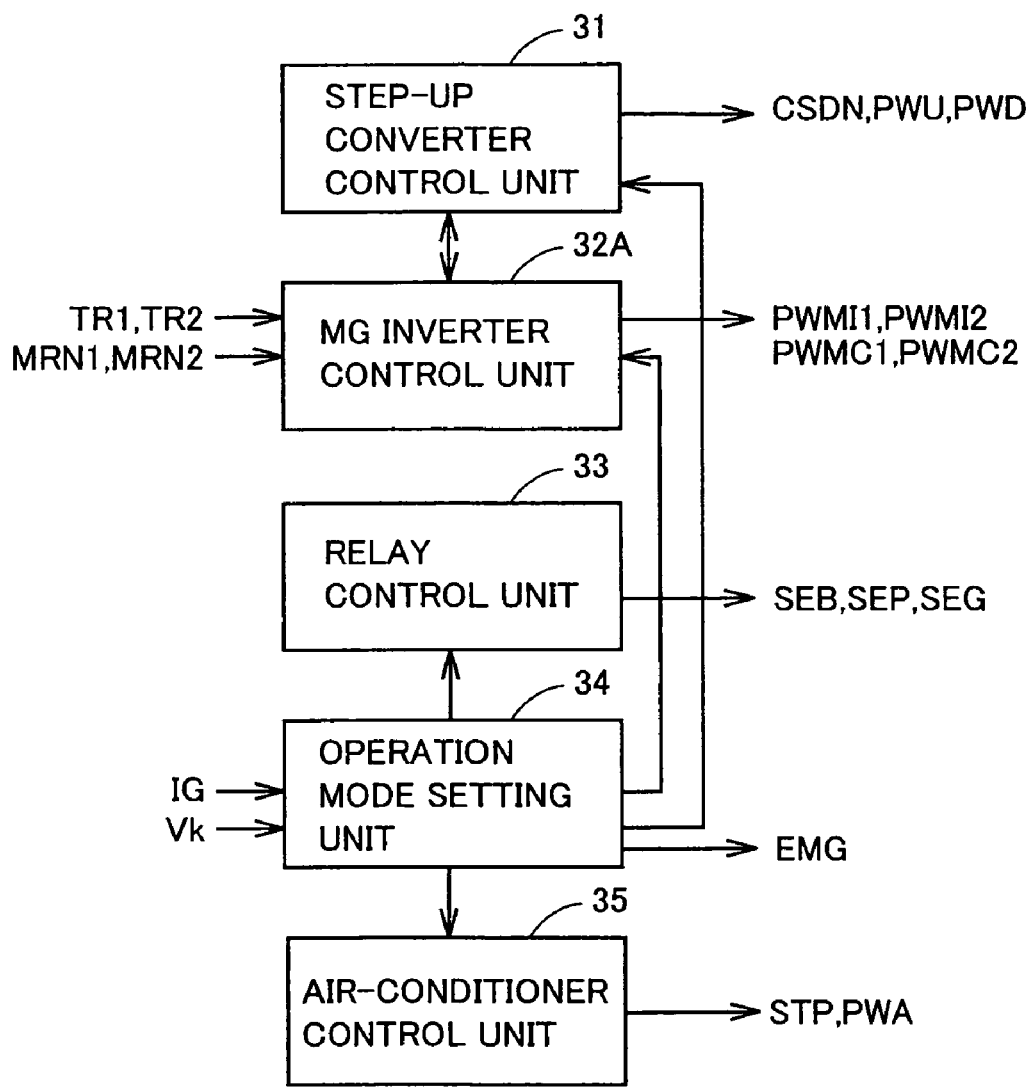
FIG. 12 is a functional block diagram of a control device 30A shown in FIG. 11.

FIG. 12 is a functional block diagram of control device 30A shown in FIG. 11.

With reference to FIG. 12 and FIG. 2, control device 30A differs from control device 30 in that it includes MG inverter control unit 32A instead of MG inverter control unit 32.

Vehicle 100A is not mounted with motor generator MG3, and hence drive instruction PWMI3 and regeneration instruction PWMC3 are not outputted from MG inverter control unit 32A. In this regard, MG inverter control unit 32A differs from MG inverter control unit 32.

The processing executed by control device 30A during stop of the operation of vehicle 100A is similar to that shown in the flowchart in FIG. 7. However, vehicle 100A is not provided with motor generator MG3, and hence a part of the processing in step S3 differs from the processing shown in the flowchart in FIG. 8.

Figure 13:
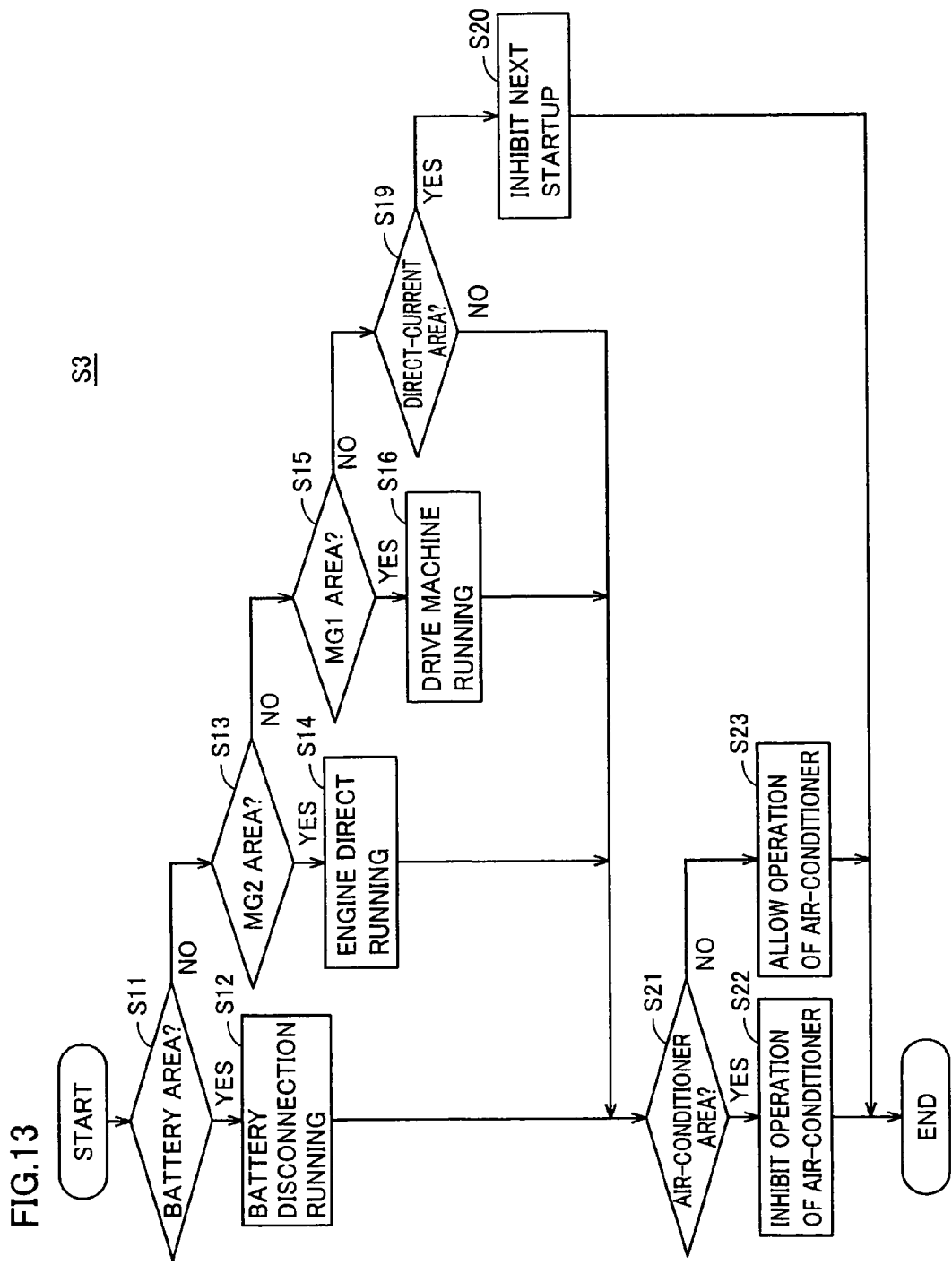
FIG. 13 is a flowchart that shows a modification of the processing shown in FIG. 8.

FIG. 13 is a flowchart that shows a modification of the processing shown in FIG. 8.

With reference to FIG. 13 and FIG. 8, the flowchart in FIG. 13 differs from the flowchart in FIG. 8 in that it does not include the processing in steps S17, S18. Further, in the flowchart in FIG. 13, if insulation resistance is not reduced in the MG1 area (NO in step S15), the processing in step S19 is executed. In this regard as well, the flowchart in FIG. 13 differs from the flowchart in FIG. 8.

Figure 14:
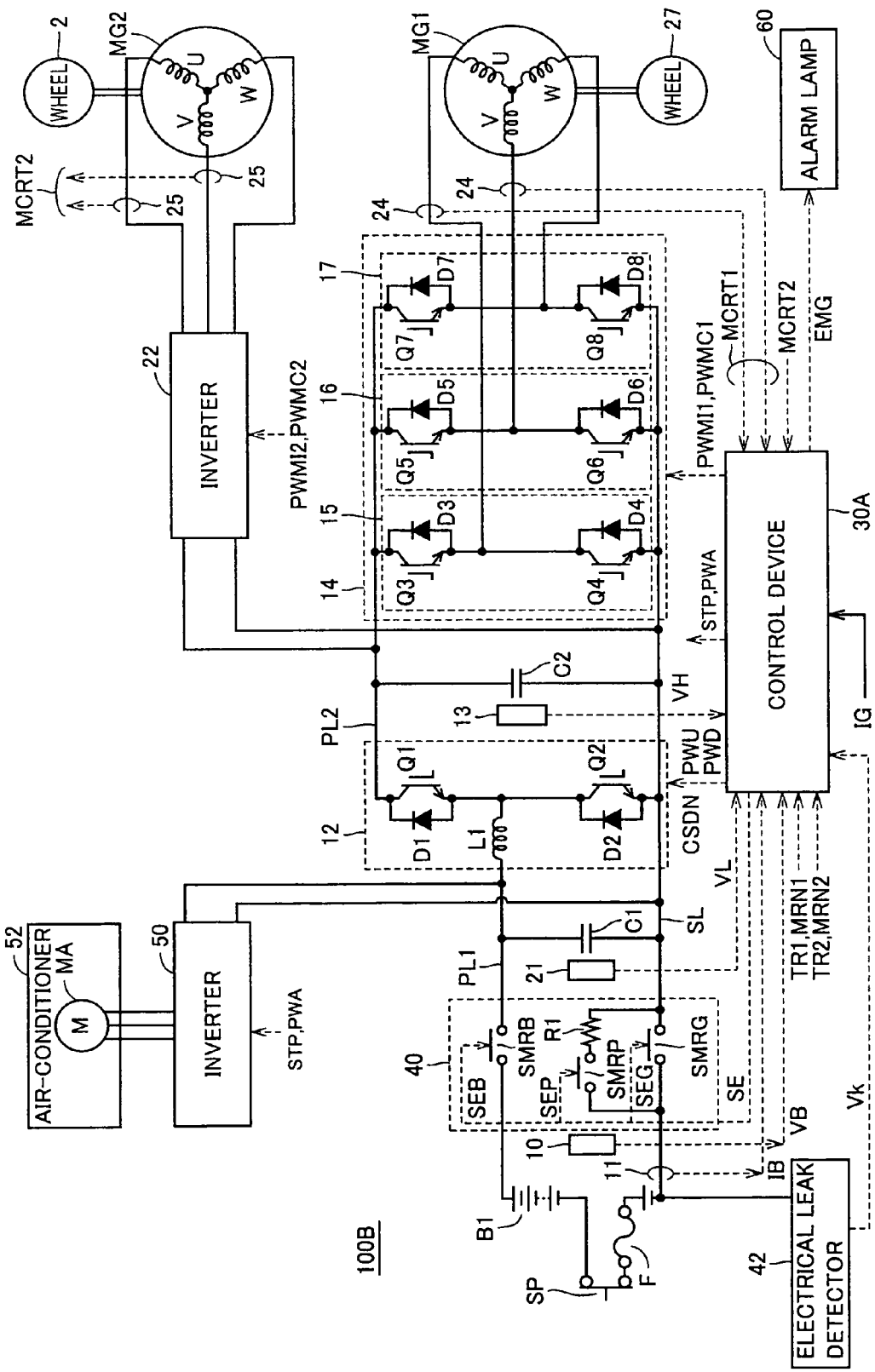
FIG. 14 is a drawing that shows a second modification of vehicle 100 in FIG. 1.

FIG. 14 is a drawing that shows a second modification of vehicle 100 in FIG. 1. Although vehicles 100, 100A are hybrid vehicles, a vehicle provided with the drive control device for the vehicle in the present embodiment can also be applied to an electric vehicle or a fuel-cell vehicle as described below.

With reference to FIG. 14 and FIG. 1, a vehicle 100A differs from vehicle 100 in that it does not include engine 4, power split device 3, and that it does not include inverter 26, motor generator MG3, and current sensor 28. Further, in vehicle 100A, motor generator MG1 drives wheel 27. It is noted that the rotary shaft of motor generator MG1 is coupled to wheel 27 by a reduction gear and a differential gear not shown. Here, wheels 27, 2 are a front wheel and a rear wheel, respectively. However, they may also be a rear wheel and a front wheel, respectively.

The configuration of control device 30A is similar to the configuration shown in FIG. 12. Further, the processing executed by control device 30A during stop of the operation of vehicle 100B is similar to that shown in the flowchart in FIG. 7. However, in this modification as well, specific features of the processing in step S3 differ from those in the processing shown in the flowchart in FIG. 8.

FIG. 15 is a flowchart that shows a modification of the processing in step S3 shown in FIG. 7.

With reference to FIG. 15 and FIG. 12, operation mode setting unit 34 initially determines whether or not insulation resistance is reduced in the battery area or the direct-current area (step S41). If insulation resistance is reduced in one or both of the battery area and the direct-current area (YES in step S41), operation mode setting unit 34 inhibits the next startup of vehicle 100B (step S42).

If insulation resistance is not reduced in both of the battery area and the direct-current area (NO in step S41), operation mode setting unit 34 determines whether or not insulation resistance is reduced in the MG1 area (step S43). If insulation resistance is reduced in the MG1 area (YES in step S43), operation mode setting unit 34 sets the operation mode such that only motor generator MG2 is driven at the next startup of vehicle 100B (step S44). In this case, an operation of motor generator MG2 is allowed, while an operation of motor generator MG1 is inhibited.

If insulation resistance is not reduced in the MG1 area (NO in step S43), operation mode setting unit 34 determines whether or not insulation resistance is reduced in the MG2 area (step S45). If insulation resistance is reduced in the MG2 area (YES in step S45), operation mode setting unit 34 sets the operation mode such that only motor generator MG1 is driven at the next startup of vehicle 100B (step S46). In this case, an operation of motor generator MG1 is allowed, and an operation of motor generator MG2 is inhibited.

If the processing in steps S44, S46 is completed, and if insulation resistance is not reduced in the MG2 area (NO in step S45), operation mode setting unit 34 determines whether or not insulation resistance is reduced in the air-conditioner area (step S47). If insulation resistance is reduced in the air-conditioner area (YES in step S47), operation mode setting unit 34 inhibits an operation of the air-conditioner (motor MA) (step S48). In contrast, if insulation resistance is not reduced in the air-conditioner area (NO in step S47), operation mode setting unit 34 allows an operation of the air-conditioner (motor MA) (step S49). If the processing in any of steps S42, S48, S49 is completed, the entire processing in step S3 is completed.

As such, in the present embodiment, the vehicle (vehicles 100, 100A, 100B) is mounted with the drive device (drive device DRV shown in FIG. 4) that includes the plurality of rotating electrical machines and the drive unit (drive unit DR1 shown in FIG. 4) that drives the plurality of rotating electrical machines. The drive control device for the vehicle according to the present embodiment includes electrical leak detector 42 that detects electrical leak in the drive device, and the operation determination unit (control devices 30, 30A) that receives a result of the detection made by electrical leak detector 42, identifies an electrical leak location, and depending on the electrical leak location, determines which rotating electrical machine out of the plurality of rotating electrical machines is allowed to operate when the vehicle is driven next time, while the vehicle is stopped. According to the present embodiment, by identifying a position where insulation resistance is reduced, it is possible to determine whether or not the vehicle can be operated next time. If the vehicle can be operated, it is possible to suppress decrease in user convenience by allowing the vehicle to perform limp home running.

It should be understood that the embodiment disclosed herein is illustrative and not limitative in all aspects. The scope of the present invention is shown not by the description above but by the scope of the claims, and is intended to include all modifications within the equivalent meaning and scope of the claims.

The invention claimed is:

1. A drive control device controlling a drive device for a vehicle, the drive device being provided with a plurality of rotating electrical machines and a drive unit driving said plurality of rotating electrical machines, said drive unit including a direct-current power supply, and a power conversion unit which converts direct-current power obtained from said direct-current power supply into alternating-current power, and supplies said alternating-current power to said plurality of rotating electrical machines, said drive control device comprising:
an electrical leak detection unit detecting electrical leak in said drive device; and
an operation determination unit identifying an electrical leak location based on a result of the detection made by said electrical leak detection unit, and determining which rotating electrical machine out of said plurality of rotating electrical machines is allowed to operate when said vehicle is driven next time, in accordance with said electrical leak location being identified, while said vehicle is stopped, wherein when said operation determination unit identifies at least one of said plurality of rotating electrical machines as said electrical leak location, said operation determination unit allows an operation of said plurality of rotating electrical machines other than said at least one rotating electrical machine and inhibits an operation of said at least one rotating electrical machine, and when said operation determination unit identifies said power conversion unit as said electrical leak location, said operation determination unit inhibits the operation of each of said plurality of rotating electrical machines.

2. The drive control device for the vehicle according to claim 1, wherein said drive device further includes an internal combustion engine,
said plurality of rotating electrical machines include
a first rotating electrical machine having a rotary shaft mechanically coupled to a crankshaft of said internal combustion engine, and
a second rotating electrical machine having a rotary shaft mechanically coupled to a rotary shaft of a wheel,
said drive unit further includes a connection unit configured to be able to interrupt connection between said direct-current power supply and said power conversion unit in accordance with an interruption command, and
said operation determination unit
generates said interruption command for setting said connection unit to an interrupted state and allows operations of said first and second rotating electrical machines, when said direct-current power supply is identified as said electrical leak location,
inhibits the operation of one of said first and second rotating electrical machines and allows the operation of the other of said first and second rotating electrical machines, when said one of said first and second rotating electrical machines is identified as said electrical leak location, and
inhibits the operations of said first and second rotating electrical machines, when said power conversion unit is identified as said electrical leak location.

3. The drive control device for the vehicle according to claim 2, wherein said plurality of rotating electrical machines further include a third rotating electrical machine, an allowable amount of a current inputted to the third rotating electrical machine being smaller than an allowable amount of a current inputted to each of said first and second rotating electrical machines, and
said operation determination unit inhibits an operation of said third rotating electrical machine, when any of said third rotating electrical machine and said power conversion unit is identified as said electrical leak location.

4. The drive control device for the vehicle according to claim 2, wherein said wheel is one of a front wheel and a rear wheel of said vehicle,
said plurality of rotating electrical machines further include a third rotating electrical machine for driving the other of the front wheel and the rear wheel of said vehicle, and said operation determination unit allows an operation of said third rotating electrical machine, when a portion other than said third rotating electrical machine is identified as said electrical leak location in said drive device.

5. The drive control device for the vehicle according to claim 1, wherein
said plurality of rotating electrical machines include
a first rotating electrical machine driving one of a front wheel and a rear wheel of said vehicle, and
a second rotating electrical machine driving the other of the front wheel and the rear wheel of said vehicle, and
said operation determination unit
inhibits an operation of one of said first and second rotating electrical machines and allows an operation of the other of said first and second rotating electrical machines, when said one of said first and second rotating electrical machines is identified as said electrical leak location, and
inhibits the operations of said first and second rotating electrical machines, when any of said direct-current power supply and said power conversion unit is identified as said electrical leak location.

6. The drive control device for the vehicle according to claim 5, wherein
said plurality of rotating electrical machines further include a third rotating electrical machine, an allowable amount of a current inputted to the third rotating electrical machine being smaller than an allowable amount of a current inputted to each of said first and second rotating electrical machines, and
said operation determination unit inhibits an operation of said third rotating electrical machine, when any of said third rotating electrical machine and said power conversion unit is identified as said electrical leak location.

7. A vehicle comprising:
a drive device including a plurality of rotating electrical machines and a drive unit driving said plurality of rotating electrical machines,
said drive unit having
a direct-current power supply, and
a power conversion unit which converts direct-current power obtained from said direct-current power supply into alternating-current power, and supplies said alternating-current power to said plurality of rotating electrical machines; and
a drive control device controlling said drive device, said drive control device including
an electrical leak detection unit detecting electrical leak in said drive device, and
an operation determination unit identifying an electrical leak location based on a result of the detection made by said electrical leak detection unit, and determining which rotating electrical machine out of said plurality of rotating electrical machines is allowed to operate when said vehicle is driven next time, in accordance with said electrical leak location being identified, while said vehicle is stopped, wherein
when said operation determination unit identifies at least one of said plurality of rotating electrical machines as said electrical leak location, said operation determination unit allows an operation of said plurality of rotating electrical machines other than said at least one rotating electrical machine and inhibits an operation of said at least one rotating electrical machine, and when said operation determination unit identifies said power conversion unit as said electrical leak location, said operation determination unit inhibits the operation of each of said plurality of rotating electrical machines.

8. The vehicle according to claim 7, wherein
said drive device further includes an internal combustion engine,
said plurality of rotating electrical machines include
a first rotating electrical machine having a rotary shaft mechanically coupled to a crankshaft of said internal combustion engine, and
a second rotating electrical machine having a rotary shaft mechanically coupled to a rotary shaft of a wheel,
said drive unit further includes a connection unit configured to be able to interrupt connection between said direct-current power supply and said power conversion unit in accordance with an interruption command, and
said operation determination unit
generates said interruption command for setting said connection unit to an interrupted state and allows operations of said first and second rotating electrical machines, when said direct-current power supply is identified as said electrical leak location,
inhibits the operation of one of said first and second rotating electrical machines and allows the operation of the other of said first and second rotating electrical machines, when said one of said first and second rotating electrical machines is identified as said electrical leak location, and
inhibits the operations of said first and second rotating electrical machines, when said power conversion unit is identified as said electrical leak location.

9. The vehicle according to claim 8, wherein
said plurality of rotating electrical machines further include a third rotating electrical machine, an allowable amount of a current inputted to the third rotating electrical machine being smaller than an allowable amount of a current inputted to each of said first and second rotating electrical machines, and
said operation determination unit inhibits an operation of said third rotating electrical machine, when any of said third rotating electrical machine and said power conversion unit is identified as said electrical leak location.

10. The vehicle according to claim 8, wherein
said wheel is one of a front wheel and a rear wheel of said vehicle,
said plurality of rotating electrical machines further include a third rotating electrical machine for driving the other of the front wheel and the rear wheel of said vehicle, and
said operation determination unit allows an operation of said third rotating electrical machine, when a portion other than said third rotating electrical machine is identified as said electrical leak location in said drive device.

11. The vehicle according to claim 7, wherein
said plurality of rotating electrical machines include
a first rotating electrical machine driving one of a front wheel and a rear wheel of said vehicle, and
a second rotating electrical machine driving the other of the front wheel and the rear wheel of said vehicle, and
said operation determination unit
inhibits an operation of one of said first and second rotating electrical machines and allows an operation of the other of said first and second rotating electrical machines, when said one of said first and second rotating electrical machines is identified as said electrical leak location, and inhibits the operations of said first and second rotating electrical machines, when any of said direct-current power supply and said power conversion unit is identified as said electrical leak location.

12. The vehicle according to claim 11, wherein
said plurality of rotating electrical machines further include a third rotating electrical machine, an allowable amount of a current inputted to the third rotating electrical machine being smaller than an allowable amount of a current inputted to each of said first and second rotating electrical machines, and
said operation determination unit inhibits an operation of said third rotating electrical machine, when any of said third rotating electrical machine and said power conversion unit is identified as said electrical leak location.

* * * * *